United States Patent [19]

Hirai et al.

[11] Patent Number: 5,227,238

[45] Date of Patent: Jul. 13, 1993

[54] CARBON FIBER CHOPPED STRANDS AND METHOD OF PRODUCTION THEREOF

[75] Inventors: Minoru Hirai; Hideaki Fukuizumi; Masakazu Ataka; Katsumi Nakama; Yoh-ichi Maeda, all of Shizuoka, Japan

[73] Assignee: Toho Rayon Co., Ltd., Tokyo, Japan

[21] Appl. No.: 781,682

[22] Filed: Oct. 24, 1991

Related U.S. Application Data

[63] Continuation of Ser. No. 433,107, Nov. 8, 1989, abandoned.

[30] Foreign Application Priority Data

Nov. 10, 1988 [JP] Japan ................... 63-284738

[51] Int. Cl.$^5$ .............................................. B44D 1/092
[52] U.S. Cl. ............................... 428/367; 428/371; 428/375; 428/377; 423/447.2; 264/29.4
[58] Field of Search ............. 428/367, 375, 371, 377; 57/236, 243; 423/447.2; 264/29.2

[56] References Cited

U.S. PATENT DOCUMENTS

| | | | |
|---|---|---|---|
| 3,301,742 | 1/1967 | Noland et al. | 428/367 |
| 3,837,904 | 9/1974 | Hill | 428/367 X |
| 3,839,072 | 10/1974 | Kearsey | 428/367 X |
| 3,914,504 | 10/1975 | Weldy | 428/367 |
| 4,686,096 | 8/1987 | Schulz et al. | 423/447.2 X |
| 4,850,186 | 7/1989 | Hiramatsu et al. | 57/236 |
| 4,855,122 | 8/1989 | Kitamura et al. | 423/447.2 X |

*Primary Examiner*—Patrick J. Ryan
*Assistant Examiner*—R. C. Weisberger
*Attorney, Agent, or Firm*—Sughrue, Mion, Zinn, Macpeak & Seas

[57] ABSTRACT

A carbon fiber chopped strands suitable for use in production of a composite with a matrix material, which have a circular or elliptical cross-section, wherein carbon fiber filaments are bundled by a sizing agent in an amount of from 1 to 10% by weight based on the chopped strand, and which have denseness of from 0.4 to 0.9 according to the formula below:

$$\text{Denseness} = \frac{Nd^2}{D^2} \qquad (1)$$

where D denotes the average diameter of the chopped strands, d denotes the average diameter of filaments constituting the chopped strand and N denotes the number of the filaments, and a method for production thereof by impregnating a carbon fiber strand with a sizing agent in an amount of from 1 to 10% by weight based on the total weight of the chopped strand to form a sized strand, and then cutting the sized strand, thereby giving the denseness of from 0.4 to 0.9 according to the formula (1).

14 Claims, No Drawings

CARBON FIBER CHOPPED STRANDS AND METHOD OF PRODUCTION THEREOF

This is a continuation of application Ser. No. 07/433,107 filed Nov. 8, 1989, now abandoned.

FIELD OF THE INVENTION

The present invention relates to a carbon fiber chopped strands which is suitable for the manufacture of a short carbon fiber reinforced composite, and it also relates to a method for producing of the carbon fiber chopped strands.

More particularly, the present invention relates to a carbon fiber chopped strands which are suitable for use as a reinforcing material for short fiber reinforced molded articles, easy to handle and excellent in dispersibility in a matrix material, and a method of producing of the carbon fiber chopped strands.

BACKGROUND OF THE INVENTION

Short carbon fiber reinforced thermoplastics (hereinafter referred to as CFRTP) containing a thermo-plastic resin as the matrix resin can be made with high productivity because of their good injection moldability, and are excellent in mechanical properties, friction and wear properties, electrical properties, dimensional stability, etc., as compared with those of a non-reinforced thermoplastic resin or a short glass fiber reinforced thermoplastic resin, so that the demand for CFRTP is rapidly increasing in use as a high performance engineering material.

CFRTP is conventionally prepared by melt blending a carbon fiber filament bundle, (namely so-called carbon fiber chopped strands) cut into a size of 3 to 10 mm and bundled with a sizing agent, or using a milled carbon fiber crushed (cut) to a size of less than 1 mm, together with, for example, thermoplastic resin pellets or powder by means of an extruder to pelletize the mixture. The pellets are molded into a molded article by an injection molding machine or an extrusion molding machine. Such methods are disclosed, for example, in British Patent 1,227,756.

The carbon fiber chopped strands and the thermoplastic resin are usually fed to the extruder by either one of the two method below:

(1) Dry blending the carbon fiber chopped strands and the thermoplastic resin, and then feeding the mixture to an extruder (a dry blending method); and (2) First feeding the thermoplastic resin to an extruder, and then feeding the carbon fiber chopped strands into the molten thermoplastic resin (a sidefeeding method).

As is widely known, the characteristics of the CFRTP depend on the fiber length of the carbon fiber. CFRTP prepared by the use of milled fiber of an extremely short fiber length has inferior characteristics in comparison with one prepared by using of carbon fiber chopped strands because of the short length of the milled fiber. Accordingly, carbon fiber chopped strands are generally used for this purpose.

If the bundling (or the bulk density) of the carbon fiber chopped strands is insufficient, the strands cannot be fed in a stable manner to an extruder.

In the dry blending method, insufficient bundling of the carbon fiber chopped strands is liable to cause spreading of the bundle into a fiber ball like state before the compounding due to the friction with the resin and other materials, which causes the fiber to float up in the hopper of the extruder or the injection molding machine and prevents quantitative feed of the fiber. As a result, steady production of an uniform resin composition is hardly achieved, and production efficiency is lowered.

In the side feed method, insufficient bundling of the carbon fiber chopped strands also hinders the quantitative feed thereof, and in some cases it may make feed of the carbon fiber chopped strands impossible.

From these fact, one can see that the carbon fiber chopped strands are required to be well bundled.

To meet the above requirement, carbon fiber is covered (or sized) with a synthetic resin which is the same as or different from the matrix resin used in the composite.

While a large amount of sizing agent is preferably added to carbon fiber chopped strands to improve the degree of the bundling, a large amount of sizing agent lowers the dispersibility of the carbon fibers at melt blending or compounding with a thermoplastic resin, preventing the separation of the carbon fibers into single filaments and keeping the bundled state of the fibers in a molded article. Thus, the poorly dispersed bundle leads to stress concentration which lowers mechanical properties (in particular, the mechanical strength). This phenomena is remarkable in polyamides, especially nylon 66, which have a low melt viscosity.

In order to improve the bundling property of the carbon fibers, crosslinking of a sizing agent has been proposed (see, for example, JP-A-63-35308 (the term "JP-A" as used herein means an "unexamined published Japanese patent application")). In this method, the degree of crosslinking has to be controlled in order to improve the bundling property and disperse the carbon fibers into single filaments at melt blending or compounding with a thermoplastic resin, and the production process conditions have to be strictly controlled. Thus, this process is not suitable for commercial production.

For improving the dispersibility in the resin of the carbon fiber chopped strands having a high bundling property, an increase in the blending efficiency of an extruder can be attempted by changing the screw design or other means, but this gives rise to breakage of the carbon fibers which adversely affects the improvement in various characteristics of CFRTP.

An excessive amount of sizing agent (having a decomposition point lower than the molding temperature) in the carbon fiber chopped strand results in the disadvantage that the sizing agent may be thermally decomposed to evolve gas in the case of that the chopped strand is employed with a heat resistant thermoplastic resin at a high processing temperature. This leads to a poor external appearance, lowered weld strength and other disadvantages in the molded articles produced. On the other hand, although dispersibility can be improved by decreasing the amount of sizing agent, the bundling property of the carbon fiber chopped strands cannot easily be improved in such case.

As described above, an improvement in the bundling property (or improvement in processability) is inconsistent with an improvement in dispersibility, and both improvements cannot easily be achieved simultaneously.

SUMMARY OF THE INVENTION

One object of the present invention is to provide carbon fiber chopped strands which simultaneously satisfy the requirements for dispersibility of carbon fibers in a matrix material and for the steady feeding of the carbon fiber chopped strands and the matrix material to an apparatus used for the production of CFRTP.

A second object of the present invention is to provide a method for producing the carbon fiber chopped strands.

The carbon fiber chopped strands of the present invention has a circular or elliptical cross-section and are bundled by a sizing agent in an amount of from 1 to 10% by weight based on the total weight (including the weight of the sizing agent) of the chopped strands and have a denseness of from 0.4 to 0.9 defined by the formula (1):

$$\text{Denseness} = \frac{N \times \left(\frac{d}{2}\right)^2 \times \pi}{\left(\frac{D}{2}\right)^2 \times \pi} = \frac{Nd^2}{D^2} \quad (1)$$

where D denotes the average diameter of the chopped strands, d denotes the average diameter of filaments constituting the chopped strand, and N denotes the number of the filaments in a chopped strand.

The carbon fiber chopped strands of the present invention are prepared by impregnating a carbon fiber strand with a sizing agent in an amount of from 1 to 10% by weight based on the total weight of the chopped strands and controlling the average diameter of the strands to obtain the proper size and shape for the cross-section of the strands, i.e., to obtain denseness of from 0.4 to 0.9.

DETAILED DESCRIPTION OF THE INVENTION

The chopped strands of the present invention have both a high bundling degree, namely feed stability, and high dispersibility.

In the present invention, the "carbon fiber(s)" (including graphite fiber(s)) comprises twistable filaments derived from, for example, polyacrylonitrile (PAN), rayon, or pitch, and these carbon fibers coated with a metal (e.g., Cu, Ni, Al, Ti, Cr, Zn, Cd, Pd, Sn, Au and Ag) thereon.

The diameter (d) of the filaments is preferably 1 to 40 μm, more preferably 5 to 15 μm. When the filaments are coated with a metal, the diameter (d) includes the thickness of the coated metal.

The carbon fiber is manufactured by known methods, for example, as disclosed in U.S. Pat. Nos. 4,197,279, 4,397,831, 4,347,279, 4,474,906 and 4,522,801. When carbon fiber is produced from PAN, PAN fiber is preoxidized in an oxidizing atmosphere (e.g., air) at about from 200° to 300° C., and then the thus obtained fiber is carbonized at about from 500° to 3,000° C. in an inert atmosphere (e.g., $N_2$, He) to obtain the desired carbon or graphite fiber.

The carbon fiber strand is preferably constituted of from 1,000 to 100,000 filaments, more preferably from 3,000 to 50,000 filaments. Those constituted of less than 1,000 filaments, although they are usable, involve high cost because the cost depends on the constituting number of the fiber according to conventional processes for producing carbon fibers, and such are not economically desirable as a reinforcing material for short carbon fiber reinforced composites which are required to be low-priced. On the other hand, those constituted of more than 100,000 filaments tend to have lower homogeneity upon mixing with a matrix material.

The sizing agent of the present invention may be either a thermoplastic resin, a thermosetting resin or a mixture thereof at any proportion including epoxy resins, urethane-modified epoxy resins, polyester resins, phenol resins, polyamide resins, polyurethane resins, polycarbonate resins, polyetherimide resins, polyamideimide resins, polystylylpyridine resins, polyimide resins, bismaleimide resins, polysulfone resins, polyethersulfone resins, epoxy-modified urethane resins, polyvinyl alcohol resins, polyvinyl pyrrolidone resins, and modified forms of the above resins (a part of the terminal residues of a polymer or a part of the side chains of a polymer are modified, for example, a polyolefin is grafted with acrylic acid or maleic acid) or mixtures thereof. The thermosetting resin used in the present invention does not contain curing agent. When a thermosetting resin is used as a sizing agent, the chopped strands should not be subjected to curing conditions (temperature and time) for the resin until the dispersion of filaments of the chopped strands is completed.

The sizing agent may be applied to the carbon fiber strand by passing the strand through a solution or an emulsion of the sizing agent or through the sizing agent in a molten state. The sizing agent may also be applied to a strand in the state of fine particles and then heat melted at a temperature of from the melting point of the sizing agent to the decomposition point thereof. In order to make the penetration complete a pressure may be added to the sizing agent melted, for example, by passing through a die. The average diameter of the fine particles is preferably 1 to 50 μm.

The sizing agent should penetrate into the fiber strand uniformly. The temperature of the solution or the emulsion is generally from 10 to 50° C. The concentration of the resin solution or the emulsion is generally from 0.5 to 30 wt %, preferably from 2 to 20 wt %, more preferably from 5 to 10 wt %, based on solution or emulsion weight.

The solvent for the solution is selected, suitably depending on the kind of the sizing agent, from water; alcohols such as ethyl alcohol and methyl alcohol; ketones such as acetone and methyethyl ketone; xylene, dichloromethane, N-methyl pyrrolidone, dimethyl formamide, tetrahydrofuran, toluene, and the like, and compatible mixtures thereof. As a medium for the emulsion usually water is used, and a surfactant is used therewith, if desired.

During the penetration with the solution or the emulsion the carbon fiber strand is applied with a tension generally of from 100 to 5,000 g/strand, and preferably of from 500 to 2,000 g/strand.

Generally, the amount of the sizing agent in the carbon fiber strand depends on the tension applied to the carbon fiber strand, twisting degree of carbon fiber strand and the sizing agent concentration in the solution or the emulsion.

The carbon fiber strand impregnated with a solution of sizing agent is subjected to drying, normally in air. To conduct the drying the strand may be heated to the temperature of the boiling point of the solvent. The temperature should not be higher than the decomposition point and when a thermosetting resin is used as a sizing agent the heating temperature should be lower than the curing temperature of the resin. The drying is usually conducted until the weight of the solvent in the sizing agent becomes less than 0.1 wt % based on the total weight of the sizing agent and that of the solvent therein. When the sizing agent is applied in a molten state, the carbon fiber strand impregnated with the resin may be cooled until the resin becomes non-tacky or is solidified.

The ratio of the longest diameter to the shortest diameter of the carbon fiber chopped strands is preferably 1 to 1.3. When the ratio exceeds 1.3 the chopped strands have difficulty in smooth feeding in an apparatus (e.g., hopper), which results in a deterioration of steady feeding of the chopped strands to an extruder or an injection molding machine. The average diameter (D) of the chopped strands is preferably from 30 to 20,000 μm, more preferably from 250 to 5,500 μm.

In order to control the shape and the size of the cross-section of the chopped strands or to provide the desired ratio of the longest and the shortest diameter to the cross-section of the chopped strands, the carbon fiber strands impregnated with the sizing agent may be passed through a die having the necessary shape and size, or the strand may be applied with tension on a roller.

Furthermore, the controlling may also be conducted by providing twists to the carbon fiber strand before and/or after the application of the sizing agent but prior to the loss of tackiness of the sizing agent or solidification of the sizing agent.

The content of the sizing agent in the carbon fiber strand is determined by a sulfuric acid decomposition method as now described.

Sulfuric acid decomposition method

Into a 200-ml conical beaker, 2 g ($W_1$) of carbon fiber chopped strands is weighed precisely. The strands are covered with a watch glass, and the sizing agent is decomposed by heating at approximately 200° C. for an hour in air.

After cooling, an aqueous hydrogen peroxide solution (about 30 wt %) is added thereto little by little until the resulting solution becomes transparent. The carbon fiber is then collected by filtering with a precisely weighed glass filter ($W_2$) and washed with approximately 1,000 ml of water. The glass filter containing the carbon fiber is then dried in air at 110±3° C. for 2 hours, and was precisely weighed after drying ($W_3$).

The amount of the adhered sizing agent is calculated according to the following formula below:

$$\text{Amount of adhered sizing agent (\% by weight)} = \frac{(W_1 - W_3 + W_2) \times 100}{W_1} \quad (2)$$

The denseness in the present invention is measured according to the method below:

Measurement of denseness 50 samples (strands) are taken out at random from the carbon fiber chopped strands constituted of N filaments. The average diameter of each sample is calculated with a micrometer by measuring the longest and the shortest diameter of all 50 samples from which the average diameter (D) is determined. Separately, from a microphotograph (magnification of about 10,000), the diameters of about 50 carbon fiber filaments are measured, and the average diameter (d) is determined. The denseness is calculated using the values of N, D and d according to the formula (1).

When the carbon fiber strand is impregnated with a solution of the sizing agent, the carbon fiber strand impregnated with the sizing agent preferably is provided with from 2 to 30 twists, preferably from 5 to 25 twists, and most preferably from 10 to 20 twists, per meter.

If the number of twist is less than 2/m, the denseness cannot be increased to 0.4 or more (even with a larger amount of adhered sizing agent). On the contrary, when the number of twist is more than 30/m, the denseness cannot be increased to 0.4 or more because the sizing agent cannot be adequately impregnated.

Twisting of the carbon fiber strand may be done as follows.

Twists may be applied to the strand by twisting the carbon fiber precursor strand (preoxidized fiber) and pyrolizing it to carbonize the same in a conventional manner, or otherwise by pyrolizing the carbon fiber precursor strand non-twisted or twisted to some degree to carbonize the same and then twisting it. Application of the sizing agent is conducted to the carbon fiber strand thus twisted. Further, the carbon fiber strand may be twisted after all or a part (usually from 1 to 50 wt %) of the necessary amount of the sizing agent is applied. In this case, the remaining sizing agent may be applied thereto after twisting. When the sizing agent is applied two or more times to the strand, either the same kind or different kinds of sizing agents can be applied. When twists are provided after all of necessary sizing agent is applied to a carbon fiber strand (non-twisted or twisted in some degree, generally up to 50% of the necessary number of the twists), twisting is conducted while the adhesiveness of the sizing agent is maintained, or prior to solidification of the sizing agent is completed.

The amount of the sizing agent in the present invention is in the range of from 1 to 10% by weight, preferably from 3 to 8% by weight.

If the amount of the sizing agent is less than 1% by weight, the carbon fiber chopped strands have low denseness and cannot be fed in a stable manner. On the contrary, if the amount is more than 10% by weight, the chopped strands lack in dispersibility and the physical properties of the composite are inferior, and, further, the amount of the decomposition gas is increased.

The denseness of the chopped strands of the present invention should be within the range of from 0.4 to 0.9, preferably more than 0.6. If the denseness is less than 0.4 the carbon fiber can not be fed in a stable manner because of an insufficient bundling property, while, on the other hand, if the denseness is more than 0.9 the chopped strand hardly disperses uniformly in a matrix material.

The thus prepared sized carbon fiber strand is then cut into a proper length. The length is generally from 1 to 10 mm, preferably from 3 to 8 mm.

Filaments of the thus obtained chopped strand are separated from each other while dispersed in a matrix material by mechanical power upon mixing with the matrix material or by raising the temperature of the chopped strand to soften or melt the sizing agent.

The sized carbon fiber chopped strands of the present invention have excellent bundling characteristics, and can be fed in a stable and satisfactory manner from a hopper of an extruder, and, because of their excellent dispersibility, the use of such material as a reinforcing material gives a composite having stable qualities.

The high dispersibility of the chopped strands reduces the breakage of extruded strands, leading to a substantial improvement in productivity. Moreover, no design change of a screw of an extruder to raise the blending degree is required for such chopped strands; thus, the chopped strands yield a molded article having a larger fiber length without excessive breakage of the fiber. As a result, molding materials having excellent characteristics are obtained by use of this material.

The carbon fiber chopped strands of the present invention are fed to an apparatus in order to mix them with a matrix resin particles or pellets and to melt the mixture, or to mix with a molten matrix resin, and then to prepare pellets or a molding by an extrusion method or an injection method.

Examples of the thermoplastic resin which can be used as a matrix include polycarbonate resins, polyamide resins, saturated polyester resins (e.g., polybutyleneterephthalate resins (PBT), and polyethylene-terephthalate resins (PET)), polyurethane resins, polyacetal resins, polysulfone resins, polyether sulfone resins (PES), polyphenylene sulfide resins (PPS), polystyrene resins (PS), polyolefin resins, polyvinyl chloride resins, polyetherketone resins (PEK), polyetheretherketone resins (PEEK) polyetherimide resins (PEI), polyarylene oxide resins, polyphenylenesulfide resins (PPS), polyamideimide resins, polyarylate resins, thermoplastic polyimide resins, and acid modified polyolefin resins. Two or more of these resins may be used in combination.

Preferable combination of a sizing agent(s) with a matrix resin(s) can be made by selecting one or more of sizing agents from the list below and one or more of matrix resins from the column the same as the sizing agent selected.

| Sizing Agent | Matrix Resin |
| --- | --- |
| Epoxy Resin | The above-disclosed Resins other than Nylon |
| Urethane-modified Epoxy Resin | Polycarbonate Resin, Polyester Resin (e.g., PET, PBT) |
| Methoxylated Nylon | Nylon, Acid-modified Polyolefin Resins |
| Polycarbonate Resin, PES, PEI | PES, PEEK, PEK, PEI, PPS |

The content of the chopped carbon fiber in the resin composite is generally from 1 to 70% by weight, preferably of from 20 to 70% by weight, based on the total weight of the composite.

The thus prepared composite has excellent mechanical properties, especially tensile strength, bending strength and interlaminer shear strength.

The examples below are intended to specifically illustrate the present invention without limiting it in any way.

EXAMPLE 1

Production of carbon fiber chopped strands

Carbon fiber strand [made by Toho Rayon Co., Ltd.; Bespite® HTA-7-12000]derived from PAN fiber which was not twisted and which had no sizing agent added thereto and which was constituted of 12,000 filaments (filament diameter: 7.0 μm) was twisted to give carbon fiber strand having twists of 0 and 10/m, respectively.

The carbon fiber strand was introduced continuously into a sizing agent bath (about 23° C.) containing a solution of two type of epoxy resins [i.e., bisphenol A epoxy resins having an epoxy equivalent of from 184 to 194 and from 450 to 500, respectively, made by Yuka Shell Epoxy K.K. as a trade name, Epikote 828 and Epikote 1001 (weight ratio: Epikote 828/Epikote 1001=8/2)]in acetone to conduct the sizing treatment (impregnating time: about 30 seconds). The concentration of the solution of the sizing agent was 3%. During the sizing treatment a tension of about 1,000 g/strand was applied to the carbon fiber strand. The thus obtained strand was dried at 120° C., and then cut to a length of 6 mm, thus giving carbon fiber chopped strands. The amounts of the sizing agent in the carbon fiber chopped strands obtained from the carbon fiber strands having no twists and having twists were 3.3% and 3.0%, respectively.

The average diameters (D) of these two types of carbon fiber chopped strands were measured and the denseness calculated according to formula (1) was 0.25 and 0.52, respectively.

EXAMPLE 2

Production of carbon fiber chopped strands

Various carbon fiber chopped strands were prepared in the same manner as in Example 1 except that the carbon fiber strands were given with twists of 0, 2, 10, 20, 30 and 40/m, respectively, and the amount of the sizing agent in the carbon fiber chopped strands was varied as shown in Table 1 by adjusting the concentration of the sizing agent in the bath.

The denseness of the thus obtained chopped strands was obtained in the same manner as in Example 1. The results are shown in Table 1.

Table 1 shows that the carbon fibers with a twist number of from 2 to 30/m give higher denseness.

TABLE 1

| Amount of sizing agent (% by weight) | Denseness Number of Twists (Twists/m) | | | | | |
| --- | --- | --- | --- | --- | --- | --- |
| | 0 | 2 | 10 | 20 | 30 | 40 |
| (0.3–0.5) | — | (0.17) | (0.31) | (0.32) | (0.28) | (0.25) |
| 1.0–1.2 | — | 0.41 | 0.45 | 0.43 | 0.41 | (0.24) |
| 3.0–3.3 | (0.25) | 0.44* | 0.52 | 0.54 | 0.50 | — |
| 5.2–5.4 | (0.26) | 0.60 | 0.68* | 0.70 | 0.62 | (0.26) |
| 9.8–9.9 | (0.26) | 0.63 | 0.80 | 0.85* | 0.66 | — |
| (12.8–13.0) | (0.32) | — | 0.82 | — | 0.67 | (0.30) |
| (17.4–17.5) | — | 0.65 | — | 0.88 | — | — |
| (19.5–19.8) | (0.30)* | — | 0.85 | — | 0.67 | (0.30) |

Notes:
1) Values in parenthesis are outside the scope of the present invention (the same hereinafter).
2) Chopped strands having a denseness marked with * were used in Example 3.

EXAMPLE 3

Use of carbon fiber chopped strand

The carbon fiber chopped strands having a denseness of 0.30, 0.44, 0.68, and 0.85 prepared in Example 2 (marked with a symbol * in Table 1) were added to dry polybutylene terephthalate (PBT) resin pellets (made by Polyplastics K.K.; Juranex 2002) so as to provide a carbon fiber content of 30% by weight. The mixtures were respectively dry blended in a tumbler (10 kg per batch) and melt blended and extruded by means of a vented 40-mm single screw extruder equipped with a screw type feeder of 80 mm outer diameter, 40 mm inner diameter, and having an 80 mm pitch. A cylinder temperature of 250° C. and an extrusion rate of approximately 10 kg/hr were used. The extruded product had a diameter of 3 mm and was cooled by water and cut with a pelletizer into pellets of 3 mm in length. Molding products were thus continuously produced. The continuous processing time of extrusion was 10 hours.

The frequency of breakage of the extruded products during the extrusion and the variation of carbon fiber (CF) content with lapse of the continuous processing time of extrusion (the average for five samples for each measurement) were observed. The results are shown in Table 2.

As is shown by Table 2, with the lapse of the continuous processing time for extrusion, the carbon fiber content in the extruded strand decreased, and carbon fibers in a fiber ball-like form came to clog the feed inlet of the extruder to decrease the material feed into the extruder, and finally the extrusion of the CF containing compound was forced to be halted.

TABLE 2

| Frequencies of Strand Breakage and Variation of CF Content with Time | | | | |
|---|---|---|---|---|
| Denseness | 0.44 | 0.68 | 0.85 | (0.30) |
| Amount of sizing agent (% by weight) | 3.2 | 5.3 | 9.9 | (19.5) |
| Number of twists per meter | 2 | 10 | 20 | 0 |
| Frequencies of strand discontinuation | 5 times/ 10 h | 4 times/ 10 h | 2 times/ 10 h | 14 times/ 3 h |
| CF content (% by weight) | | | | |
| 0.5 hour after | 29.3 | 30.8 | 30.9 | 28.5 |
| 1.0 hour after | 31.6 | 29.7 | 30.6 | 21.3 |
| 1.5 hours after | 30.5 | 31.4 | 29.8 | 10.9 |
| 2.0 hours after | 32.1 | 29.4 | 29.0 | 2.3 |
| 3.0 hours after | 28.5 | 30.1 | 31.2 | not extrusible |
| 4.0 hours after | 30.9 | 28.7 | 30.5 | — |
| 5.0 hours after | 29.8 | 28.5 | 29.2 | — |
| 6.0 hours after | 32.6 | 29.2 | 29.7 | — |
| 7.0 hours after | 30.5 | 30.5 | 28.9 | — |
| 8.0 hours after | 27.8 | 30.7 | 30.4 | — |
| 9.0 hours after | 29.3 | 28.9 | 29.5 | — |
| 10.0 hours after | 31.5 | 30.7 | 30.7 | — |

From Table 2, it can be seen that the denseness of the carbon fiber chopped strands is required to be at least 0.4 for obtaining a molding material having a uniform content of carbon fiber in a stable manner. In order to obtain such carbon fiber chopped strands, the number of twists of the carbon fiber should be 2 to 30/m, and the amount of the sizing agent should be not less than 1% by weight (according to the results shown in Table 1).

EXAMPLE 4

Production of molding materials using sized carbon fiber chopped strands

Five types of carbon fiber chopped strands having denseness in the range of from 0.65 to 0.7 and having various sizing agent contents were selected from those produced in Example 2. Production of molding materials containing 30% by weight carbon fiber was carried out for 10 hours using these carbon fiber chopped strands in the same manner as in Example 3. Table 3 shows the frequencies of breakage of the extruded strands. The breakage of extruded products was observed to occur more frequently as the content of the sizing agent exceeded 10% by weight. Bundles of carbon fibers were observed in the breakage portions of the strands, and the size of the carbon fiber bundles (number of filaments) was observed to tend to increase with an increase of the sizing agent.

TABLE 3

| Frequencies of Strand Discontinuation | | | | |
|---|---|---|---|---|
| Denseness | 0.68 | 0.66 | 0.65 | 0.67 |
| Amount of sizing agent (% by weight) | 5.3 | 9.9 | (17.4) | (19.8) |
| Number of twists per meter | 10 | 30 | 2 | (30) |
| Frequencies of strand discontinuation | 4 times/ 10 h | 6 times/ 10 h | 17 times/ 10 h | 25 times/ 10 h |

TABLE 4

| Frequencies of Strand Discontinuation | | | | |
|---|---|---|---|---|
| Denseness | 0.68 | 0.66 | 0.65 | 0.67 |
| Amount of sizing agent (% by weight) | 5.3 | 9.9 | (17.4) | (19.8) |
| Number of twists per unit | 10 | 30 | 2 | (30) |
| Tensile strength (kgf/mm$^2$) | 19.1 | 18.7 | 16.5 | 13.1 |
| Rate of poor dispersion (%) | 2 | 2 | 25 | 35 |

EXAMPLE 5

Use of molding material obtained from carbon fiber chopped strands

The molding material containing carbon fiber in an amount of 30% by weight produced in Example 4 was dried. Test specimens were prepared therefrom using an injection molding machine (made by Toshiba Machine Co., Ltd.; IS-100E) at a cylinder temperature of 260° C., a back pressure of 5 kg/cm$^2$ (gauge pressure), and an injection pressure of 120 kg/cm$^2$ (gauge pressure).

The resulting 50 test specimens were tested according to ASTM D-638 (tensile strength), ASTM D-790 (bending strength) and ASTM D-256 (Izod impact value). The ruptured cross-sections were observed to evaluate the presence of non-dispersed carbon fiber bundles under a magnification of 3X, where a non-dispersed carbon fiber bundle which can be observed constituted of about 50 or more filaments. A test specimen was judged to be of poor dispersion, if at least one non-dispersed carbon fiber strand was observed in the specimen. Table 4 shows the tensile strength and percentage of poor dispersion of the specimens.

While the invention has been described in detail and with reference to specific embodiments thereof, it will be apparent to one skilled in the art that various changes and modifications can be made therein without departing from the spirit and scope thereof.

What is claimed is:

1. Carbon fiber chopped strands having a circular or elliptical cross-section, wherein 1,000 to 100,000 carbon fiber filaments are bundled by a sizing agent comprising at least one resin selected from the group consisting of thermosetting resins and thermoplastic resins in an amount of from 1 to 10% by weight based on the total weight of chopped strands, said strands having two to thirty twists per meter, having a length of 1 to 10 mm, and having a denseness of from 0.4 to 0.9 according to the formula below:

$$\text{Denseness} = \frac{Nd^2}{D^2} \quad (1)$$

where D denotes the average diameter of the chopped strands, d denotes the average diameter of filaments constituting the chopped strands and N denotes the number of the filaments.

2. The carbon fiber chopped strands as in claim 1, wherein the average diameter of the filaments (d) is from 1 to 40 μm.

3. The carbon fiber chopped strands as in claim 1, wherein the average diameter of the carbon fiber chopped strands is from 30 to 20,000 μm.

4. The carbon fiber chopped strands as in claim 1, wherein the ratio of the longest diameter to the shortest diameter of the elliptical cross section is from 1 to 1.3.

5. The carbon fiber chopped strands as in claim 1, wherein the sizing agent is at least one resin selected from the group consisting of epoxy resins, urethane-modified epoxy resins, polyester resins, phenol resins, polyamide resins, polyurethane resins, polycarbonate resins, polyetherimide resins, polyamideimide resins, polystylylpyridine resins, polyimide resin, bismaleimide resins, polysulfone resins, polyethersulfone resins, epoxy-modified urethane resins, polyvinyl alcohol resins, polyvinyl pyrrolidone resins, resins and mixtures thereof.

6. The carbon fiber chopped strands as in claim 1, wherein said carbon fiber chopped strands are obtained by impregnating a carbon fiber strand with a solution or an emulsion of the sizing agent and then subjecting the carbon fiber strand to drying.

7. The carbon fiber chopped strands as in claim 6, wherein the concentration of the solution or emulsion of the sizing agent is from 0.5 to 30 wt %.

8. The carbon fiber chopped strands as in claim 6, wherein the impregnating is at a temperature of from 10° to 50° C.

9. The carbon fiber chopped strands as in claim 6, wherein during the impregnation, the carbon fiber strand has applied thereto a tension of from 100 to 5,000 g/strand.

10. The carbon fiber chopped strands as in claim 1, wherein the average diameter of the filaments (d) is from 1 to 40 μm, the number of filaments (N) is from 1,000 to 100,000, the average diameter of the carbon fiber chopped strands is from 30 to 20,000 μm, the ratio of the longest diameter to the shortest diameter of the elliptical cross section is from 1 to 1.3, the length of the chopped strands is from 1 to 10 mm, wherein the carbon fiber chopped strands are obtained by impregnating a carbon fiber strand with a solution or an emulsion of the sizing agent and then subjecting the carbon fiber strand to drying, the concentration of the solution or emulsion of the sizing agent is from 0.5 to 30 wt %, the impregnating is conducted at a temperature of from 10° to 50° C., and wherein during the impregnating the carbon fiber strand has applied thereto a tension of from 100 to 5,000 g/strand.

11. The carbon fiber chopped strands as in claim 1, wherein the denseness is at least 0.6.

12. The carbon fiber chopped strands as in claim 1, wherein the amount of the sizing agent is at least 3% by weight.

13. The carbon fiber chopped strands as in claim 1, wherein said carbon fiber chopped strands have at least 5 twists per meter.

14. The carbon fiber chopped strands as in claim 1, wherein said carbon fiber strand is derived from polyacrylonitrile fiber strand.

* * * * *